US009363247B2

(12) United States Patent
Murray (10) Patent No.: US 9,363,247 B2
(45) Date of Patent: Jun. 7, 2016

(54) METHOD OF SECURING FILES UNDER THE SEMI-TRUSTED USER THREAT MODEL USING SYMMETRIC KEYS AND PER-BLOCK KEY ENCRYPTION

(71) Applicant: Zettaset, Inc., Moutain View, CA (US)

(72) Inventor: Eric A. Murray, Los Gatos, CA (US)

(73) Assignee: ZETTASET, INC., Mountain View, CA (US)

( * ) Notice: Subject to any disclaimer, the term of this patent is extended or adjusted under 35 U.S.C. 154(b) by 57 days.

(21) Appl. No.: 14/245,295

(22) Filed: Apr. 4, 2014

(65) Prior Publication Data
US 2015/0288664 A1 Oct. 8, 2015

(51) Int. Cl.
| | |
|---|---|
| *H04L 29/06* | (2006.01) |
| *G06F 21/60* | (2013.01) |
| *H04L 9/08* | (2006.01) |
| *H04L 9/14* | (2006.01) |
| *G06F 17/30* | (2006.01) |
| *G06F 21/62* | (2013.01) |

(52) U.S. Cl.
CPC ............ *H04L 63/0435* (2013.01); *G06F 17/30* (2013.01); *G06F 21/602* (2013.01); *G06F 21/6218* (2013.01); *H04L 9/0861* (2013.01); *H04L 9/14* (2013.01); *G06F 2221/2107* (2013.01); *H04L 63/08* (2013.01)

(58) Field of Classification Search
CPC ..... H04L 63/0435; H04L 9/0861; H04L 9/14; H04L 63/08; G06F 21/602; G06F 17/30; G06F 21/6218; G06F 2221/2107
See application file for complete search history.

(56) References Cited

U.S. PATENT DOCUMENTS

| | | | | |
|---|---|---|---|---|
| 6,618,789 | B1 * | 9/2003 | Okaue et al. | 711/103 |
| 6,792,539 | B1 * | 9/2004 | Oishi et al. | 713/194 |
| 7,319,751 | B2 * | 1/2008 | Kirichenko | 380/37 |

(Continued)

FOREIGN PATENT DOCUMENTS

| | | |
|---|---|---|
| EP | 2511848 A2 | 10/2012 |
| WO | 2013093209 A1 | 6/2013 |

OTHER PUBLICATIONS

Bian, et al., The Jigsaw Secure Distributed File System, Division of Biomedical Informatics, Univ. of AK for Medical Sciences, 2009, pp. 1-24, IEEE Symposium on Computational Intelligence in Cyber Security, Journal Version, Nashville, TN, USA.

(Continued)

*Primary Examiner* — Joseph P Hirl
*Assistant Examiner* — J. Brant Murphy
(74) *Attorney, Agent, or Firm* — Asif Ghias (57) ABSTRACT

A computer system and method for securing files in a file system equipped with storage resources that are accessible to an authenticable user operating with an untrusted client device under the semi-trusted client threat model. The file to be secured is stored in one or more blocks belonging to the storage resources along with symmetric per-block key(s) $KB_i$ assigned to each of the blocks in the file. The blocks are encrypted with the symmetric per-block keys to obtain encrypted blocks. The user is assigned user key(s) and each per-block key that was used for encryption is in turn encrypted with one of the user's keys to derive wrapped key(s) for each encrypted block. Wrapped key(s) are placed in encrypted block headers and introduce a level of indirection to encrypted file(s) that is appropriate for the semi-trusted client threat model.

22 Claims, 6 Drawing Sheets

(56) References Cited

U.S. PATENT DOCUMENTS

| | | | |
|---|---|---|---|
| 7,392,384 B2* | 6/2008 | Hopkins et al. | 713/168 |
| 7,921,284 B1* | 4/2011 | Kinghorn | G06F 21/6209 |
| | | | 713/160 |
| 8,037,319 B1* | 10/2011 | Clifford | 713/193 |
| 8,121,294 B2* | 2/2012 | Ciet et al. | 380/277 |
| 8,397,084 B2* | 3/2013 | Ranade | 713/193 |
| 8,667,273 B1* | 3/2014 | Billstrom et al. | 713/165 |
| 8,782,441 B1* | 7/2014 | Osterwalder et al. | 713/193 |
| 8,832,466 B1* | 9/2014 | McGregor et al. | 713/193 |
| 2009/0304180 A1* | 12/2009 | Kunigk et al. | 380/44 |
| 2010/0095115 A1* | 4/2010 | Murray | 713/165 |
| 2010/0095132 A1* | 4/2010 | Murray | 713/189 |
| 2010/0098255 A1* | 4/2010 | Ciet et al. | 380/277 |
| 2010/0150344 A1* | 6/2010 | Karroumi et al. | 380/45 |
| 2012/0189119 A1* | 7/2012 | Brickell et al. | 380/44 |
| 2013/0136256 A1* | 5/2013 | Relyea et al. | 380/28 |
| 2013/0346716 A1* | 12/2013 | Resch | 711/162 |
| 2014/0075518 A1* | 3/2014 | D'Souza et al. | 726/4 |
| 2014/0089683 A1* | 3/2014 | Miller et al. | 713/193 |

OTHER PUBLICATIONS

Borthakur, D, The Hadoop Distributed File System: Architecture and Design, http://hadoop.apache.org/docs/current/hadoop-project-dist/hadoop-hdfs/HdfsDesign.html, 2014, pp. 1-14, Apache Software Foundation.

Howard, et al., Scale and Performance in a Distributed File System, ACM Transactions on Computer Systems, vol. 6, No. 1, Feb. 1988, pp. 51-81, ACM New York, NY, USA.

Kher, et al., Securing Distributed Storage: Challenges, Techniques, and Systems, Proceedings of the 2005 ACM workshop on Storage security and survivability, 2005, pp. 9-25, ACM New York, NY, USA.

Pletka, et al., Cryptographic Security for a High-Performance Distributed File System, Mass Storage Systems and Technologies, 2007., pp. 227-232, MSST 2007. 24th IEEE Conference, San Diego, CA, USA.

Sandberg, R, The Sun Network Filesystem: Design, Implementation and Experience, Sun Microsystems, Inc,, 1986 USENIX, California, USA.

Warner, et al., Tahoe: A Secure Distributed Filesystem, http://allmydata.org, Mar. 2008, https://tahoe-lafs.org/~warner/pycon-tahoe.html.

* cited by examiner

METHOD OF SECURING FILES UNDER THE SEMI-TRUSTED USER THREAT MODEL USING SYMMETRIC KEYS AND PER-BLOCK KEY ENCRYPTION

FIELD OF THE INVENTION

This invention relates to enabling computer systems that serve files to authenticable users that access the system from untrusted client devices to secure these files in an efficient manner under the corresponding semi-trusted user threat model, more precisely, the invention applies to highly available file systems that use symmetric keys and per-block key encryption to achieve file security.

BACKGROUND ART

The evolution of large networks and computing resources in the cloud are posing new challenges to file security in the era of the highly mobile user. Files that are served to such users from resources that are in the cloud can be accessed with various types of user devices. These devices may be mobile or stationary. The devices themselves can be the user's primary devices, but more often they devices that the user treats as secondary, tertiary or even sporadic.

Under these parameters, users that can access files stored in the cloud from many different devices present a particular problem, since their devices are less trustworthy than the users. Hence, securing files served up through computer clusters in conformance to this new threat model has become a pressing need. More precisely, the problem concerns securing high performance compute cluster's distributed file systems. The file system must allow access from many different client devices that are not trusted, but their users can be authenticated. The file system data must be available for processing on nodes inside the cluster (cluster computing).

Existing encrypted distributed file systems do not meet the requirements. They are not designed for "big data" cluster computing and do not offer the required performance. This refers in particular to Tahoe and JigDFS. As explained by Bian, J. and Seker R., "The Jigsaw Secure Distributed File System", Computers & Electrical Engineering, Feb. 1, 2013, the class of secure distributed file systems such as Tahoe and Cleversafe use an Information Dispersal Algorithm (IDA) to achieve fault tolerance as well as introduce a certain level of security. JigDFS falls into this category as well. Especially in Tahoe, like in JigDFS, files to be uploaded are encrypted, then split up into slices. Each slice is uploaded to a different server to spread the load uniformly, avoid correlated failures, and limit each node's knowledge about the original file. However, unlike Tahoe and Cleversafe JigDFS employs a decentralized peer-to-peer structure that enhances the system's scalability and improves the system availability in the event of a server failure. Moreover, in JigDFS, file segments are encrypted recursively using keys derived from the hashed-key chain algorithm and then sliced further through the IDA encoder. By doing so, JigDFS not only increases system's fault tolerance and data availability, but also makes attacks on file system and data more difficult. However, a JigDFS cluster is organized as a decentralized peer-to-peer network without a central server.

Systems that do offer commensurate performance levels, on the other hand, require that client devices be trusted and are hence not well-suited under the new threat model. Still others, such as NFS, AFS and HDFS do not protect data cryptographically.

Encryption usually imposes a heavy burden on a file system. To limit this burden, there is a need to avoid separate encryption work such as block-level encryption for data at rest and separate, e.g., storage network encryption for data in flight or in transit. This issue is identified by Pletka R., et al., "Cryptographic Security for a High-Performance Distributed File System", IBM Zurich Research Laboratory, Switzerland, 2006, pp. 1-13. The authors also point out that an optimally secure distributed storage architecture should minimize the use of cryptographic operations and avoid unnecessary decryption and re-encryption of data as long as the data does not leave the file system.

Of course, encryption of data by block and per-page keys is known in the art. For example, U.S. Pat. No. 8,121,294 to Ciet et al. discloses systems, methods and media that split input data into blocks and derive per page keys. These are obtained by using a master key in conjunction with still other keys.

In EP 2,511,848 Van der Veen teaches encryption of data that is appropriate for large scale file systems. Van der Veen deploys a per-data key or an "object" cryptographic key that is encrypted in a different key, thus providing for a level of indirection to the encrypted files in the process. The second key is a per "domain" key. These teachings are specifically concerned with file metadata that could be stored anywhere in the system.

Despite the many useful teachings outlined in the above references and many more contained in the literature, there exists an unmet need for proper safeguarding of files in file systems served in the cloud. Here, the prior art teachings do not provide for a method and system that can be deployed in a distributed file system (DFS) on a computer cluster that is accessed under the threat model of an untrusted device used by an authenticable user (semi-trusted user threat model).

OBJECTS AND ADVANTAGES OF THE INVENTION

In view of the shortcomings of the prior art, it is an object of the invention to provide for secure file systems and encryption methods while operating under the semi-trusted user threat model. More precisely, it is an object of the invention to enable efficient and rapid file systems, including distributed file systems in highly available computer clusters, to achieve a relatively high level of security rapidly and by using only symmetric keys.

It is a further object of the invention to achieve the above without having to resort to information dispersal and while assuring data file security in transit.

Further, it is an object of the invention to provide for encrypting data in a distributed file system in a way that cryptographically enforces data access permissions yet does not greatly impact performance or usability, and allows for fast data analysis on the nodes in the cluster.

These and many other objects and advantages of the invention will become apparent from the ensuing description.

SUMMARY OF THE INVENTION

A number of objects and advantages of the invention are achieved by a computer system and method designed for securing a plaintext file $F_p$ in a file system equipped with storage resources that are accessible to an authenticable user U operating with an untrusted client device. The threat model underlying the invention is a rather uncommon situation that will be referred to herein as a semi-trusted client model. Now, plaintext file $F_p$ that is to be secured is stored or distributed across one or more blocks $M_i$ belonging to the storage resources of the file system. A symmetric per-block key $KB_i$ is assigned to each of the one or more blocks $M_i$ in which plaintext file $F_p$ is stored. The one or more blocks $M_i$ that contain plaintext file $F_p$ are encrypted with the corresponding symmetric per-block key $KB_i$ to obtain corresponding one or more encrypted blocks $C_i$. As a result of encryption, the one or more encrypted blocks $C_i$ contain a ciphertext file $F_c$ corresponding to the plaintext file $F_p$ that is to be secured.

In accordance with the invention and under the semi-trusted client threat model, the authenticable user U is assigned one or more user keys KU. Then, each corresponding per-block key $KB_i$ that was used to generate the one or more encrypted blocks $C_i$ is in turn encrypted with one of the user keys KU. One thus derives a wrapped key for each of the encrypted blocks $C_i$. The one or more wrapped keys thus produced, are placed in a header of the corresponding one or more encrypted blocks $C_i$ to which they belong. Advantageously, the one or more such wrapped keys introduce a level of indirection to ciphertext file $F_c$ that is appropriate for the semi-trusted client threat model.

In a preferred embodiment, the user key KU is stored in a key manager. Furthermore, the method includes the step of authenticating the authenticable user U such that, despite the fact that the client device is untrusted, user U is at least authenticated. Upon authentication, the user key KU is released to user U.

Depending on the embodiment and mode of implementation, the authentication step can be performed by any suitable system components. For example, a policy and authentication engine dedicated to this task performs the authentication step. In fact, in some embodiments the policy and authentication engine and the key manager that stores user keys KU can be merged into a single module.

In one specific embodiment, upon receiving from the user U a request for the ciphertext file $F_c$, a user key ID is collected from each of the one or more encrypted blocks $C_i$ that contain the requested ciphertext file $F_c$. The user key ID is then submitted to the policy and authentication engine to allow for selecting the appropriate user key KU to be returned if the user has permission to use that user key KU.

Further, it is preferable that the connection between the untrusted client device and the key manager as well as the policy and authentication engine, irrespective of whether the latter two are a single module or not, be a secure and mutually authenticated connection. Otherwise, the user key KU could be sent wrapped in a key exchange key to the user U.

Although the invention can be practiced in many contexts, it is preferably implemented in a file system that is a distributed file system (DFS). Exemplary distributed file systems are Mogile FS and Hadoop Distributed File System (HDSF). It is noted that the invention may also be practiced in a non-distributed file system by either using a loopback type file system if POSIX compliance is required or it can be used directly by applications. The storage resources will typically be distributed storage resources. Modern computer clusters satisfy these criteria and hence represent suitable contexts for practicing the invention. When deploying in such clusters, high availability computer clusters are preferable.

In practical implementations the user U will typically be a member of a group of such authenticable users working on untrusted client devices. In those situations the user key KU can be shared among the group. In administering such situations, it is advantageous to introduce one or more permission zones that are defined by a mapping between the users, a set of permissions and the desired frequency of use of a given user key KU. The user key KU can then be shared with the zone or zones based on the established mapping. Further, administrators can require that different user keys KUs be used for the same user U in each directory tree, directory or even on a per-block basis.

In the event of a compromised user key KU, the affected key is revoked thus preventing further access by the user U. Then a key rotation is performed: the corresponding wrapped key or keys are erased from the affected headers, the blocks are re-encrypted using new per-block keys $KB_i$, and the per-block keys $KB_i$ are wrapped in a user key KU to which the new owner(s) of the file have access rights.

The present "layered approach" to security under the semi-trusted client model is well suited to modern mobile environments. In fact, the computers system of the invention is well-adapted to applications where the untrusted client device is a mobile user device that may or may not be the user's permanent device. In general, the untrusted client device can thus be a mobile phone, a mobile computer, a tablet computer and any one of a large and growing number of thin client devices that include sensor-based computing units on the Internet of things.

The present invention, including the preferred embodiment, will now be described in detail in the below detailed description with reference to the attached drawing figures.

DETAILED DESCRIPTION

The following description relates to preferred embodiments of the present invention by way of illustration only. Likewise, the figures depict embodiments of the present invention for purposes of illustration only. One skilled in the art will readily recognize from the description and figures that alternative embodiments of the methods and systems depicted herein may be employed without departing from the principles of the invention described herein.

Figure 1:
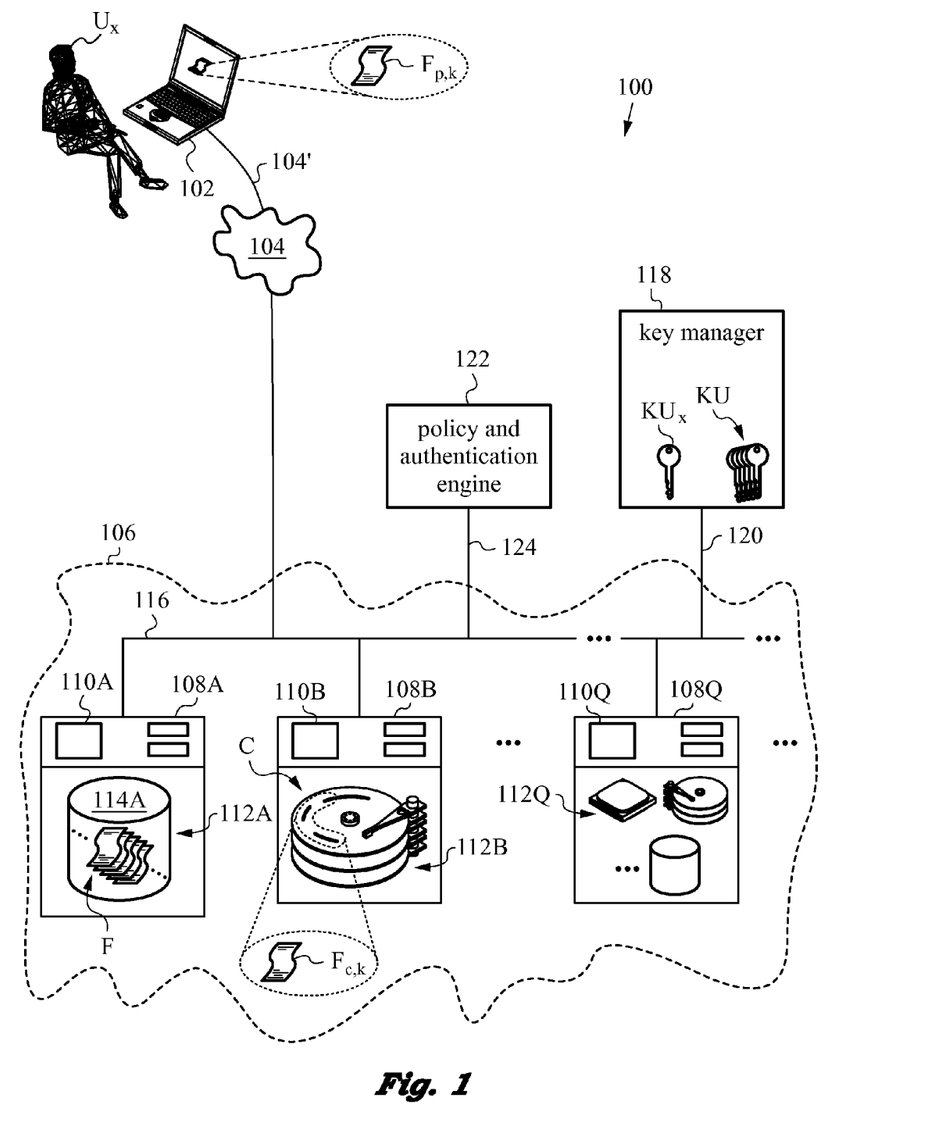
FIG. 1 is a high-level diagram illustrating the main aspects of a computer system deploying methods associated with the semi-trusted client threat model according to the invention.

The present invention will be best understood by initially referring to the high-level diagram of FIG. 1. This drawing shows the main aspects of a computer system 100 deploying methods associated with the semi-trusted client threat model according to the invention. The semi-trusted client threat model underlying the invention is presently a rather uncommon situation. That is because most prior art computer systems, e.g., cloud based platforms and various types of computer clusters, prefer to work with both client equipment and users that are authenticable.

Under the semi-trusted client threat model an authenticable user U, in this case designated as a specific authenticable user $U_x$, is working with an untrusted client device 102. In the present embodiment, client device 102 is a mobile computer, and more specifically still a laptop computer. In general, however, client device 102 can be any type of device capable of making a network connection and performing any useful function. In most cases, of course, client device 102 is a mobile user device such as a mobile phone, a mobile computer, a tablet computer or any thin client device, including devices ranging from electronic watches to sensors with minimal processing capabilities. The latter are sometimes referred to as networked devices making up the Internet of things by those skilled in the art.

Authenticable user $U_x$ uses his laptop computer 102 to connect to computer system 100 over a network connection 104 by any suitable medium 104'. Connection 104 can thus deploy any type of wireless or wired medium 104'. In fact, communication network 104 can include a Wide Area Network (WAN) like the Internet, a Metropolitan Area Network (MAN) or a Local Area Network (LAN). The physical connection can be supported by any communications infrastructure including wired, optical and wireless.

In the preferred embodiment, computer system 100 is implemented in a computer cluster 106 encompassed by a dashed line. Cluster 106 can be geographically collocated or spread out over several physical locations. For reasons of clarity, only the few parts of cluster 106 required to explain the invention are shown explicitly. It will be evident to a skilled artisan, however, that computer cluster 106 can also be implemented on various computer grids and other configurations well known in the art.

Cluster 106 has a number of machines or computers typically referred to as nodes by those skilled in the art. Of all such nodes, which may number in the hundreds or even thousands, only three, namely nodes 108A, 108B, 108Q are expressly shown. In this example, nodes 108A, 108B, 108Q are all provisioned with similar computing or processing resources 110A, 110B, 110Q. These may include central processing units (CPUs), graphical processing units (GPUs) and any generally acceptable dedicated or generic processor.

In contrast to their processing resources, nodes 108A, 108B, 108Q are provisioned with different types of storage resources 112A, 112B and 112Q. Resources 112A are embodied by any local storage hardware capable of storing files generally designated by reference F in any suitable format including preferably a file system 114A. Resources 112B are embodied by a local hard disk array that can also store files F, in either the same or a different file system. Preferably, in fact, file system 114A is a distributed file system that is stored and managed across cluster 106, thus including node 108B and its storage resources 112B.

The embodiment in FIG. 1 is one in which file system 114A is indeed distributed over the nodes of cluster 106. A specific plaintext file $F_{p,k}$ from distributed file system 114A is shown in unencrypted form being worked on by user $U_x$ on laptop computer 102. Also shown is the corresponding encrypted or ciphertext file $F_{c,k}$. Ciphertext file $F_{c,k}$ is stored or distributed over blocks M designated within an area indicated by a dashed outline on the top hard disk belonging to hard disk array 112B. The details of plaintext file $F_{p,k}$ handling and its encryption to ciphertext file $F_{c,k}$ will be described further below.

Meanwhile, resources 112Q are heterogeneous and thus include all types of suitable hardware including flash storage drives, disk drives including redundant arrays such as RAID and optical storage resources. There is no limitation on the types of storage devices, other then they should be partitionable into blocks. Thus, resources 112Q are also capable of storing files F distributed over any number of storage blocks belonging to their block-storage devices. Further, resources 112Q are also capable of storing files F belonging to distributed file system 114A.

The nodes of cluster 106, including nodes 108A, 108B, 108Q are interconnected by a corresponding network of interconnections 116. In many situations, interconnections 116 are embodied by a local area network LAN and include any special connections, such as heartbeat lines, etc. Furthermore, when cluster 106 is geographically spread out, interconnections 116 include the requisite intra- and inter-cluster communication fabric including any suitable wide area network lines (WAN) or dedicated pipes.

In accordance with a preferred embodiment of the invention under the semi-trusted client threat model, computer system 100 deploys a key manager 118 for generating and handling user keys KU. Key manager 118 can be a separate unit, a module outside cluster 106 or it can be included in or as part of cluster 106. In the embodiment shown, key manager 118 resides outside cluster 106 and is connected to it via connection 120.

Computer system 100 is also equipped with a policy and authentication engine 122. Engine 122 is dedicated to the task of authenticating authenticable users U. More precisely, engine 122 is to perform an authentication step preceding the release of user keys KU from key manager 118. For that reason, in some embodiments engine 122 and key manager 118 can be merged into a single module as a unified service rather than separate services. In fact, such joint key manager and policy and authentication engine could even be included in cluster 106. A joint key manager could even be implemented on one of the cluster's nodes, potentially including the master node (not explicitly shown) in charge of administration of cluster 106. On the other hand, in situations where such a merger could compromise security, engine 122 and key manager 118 are kept separate.

In the present embodiment, engine 122 is a stand-alone unit outside of cluster 106 and separate from key manager 118. In order to interface with cluster 106 and with key manager 118, engine 122 is provided with a suitable communication connection 124 to cluster 106, as shown. Clearly, connection 124, just like connection 120, can be made via any suitable wireless or wired communication medium.

Figure 2A:
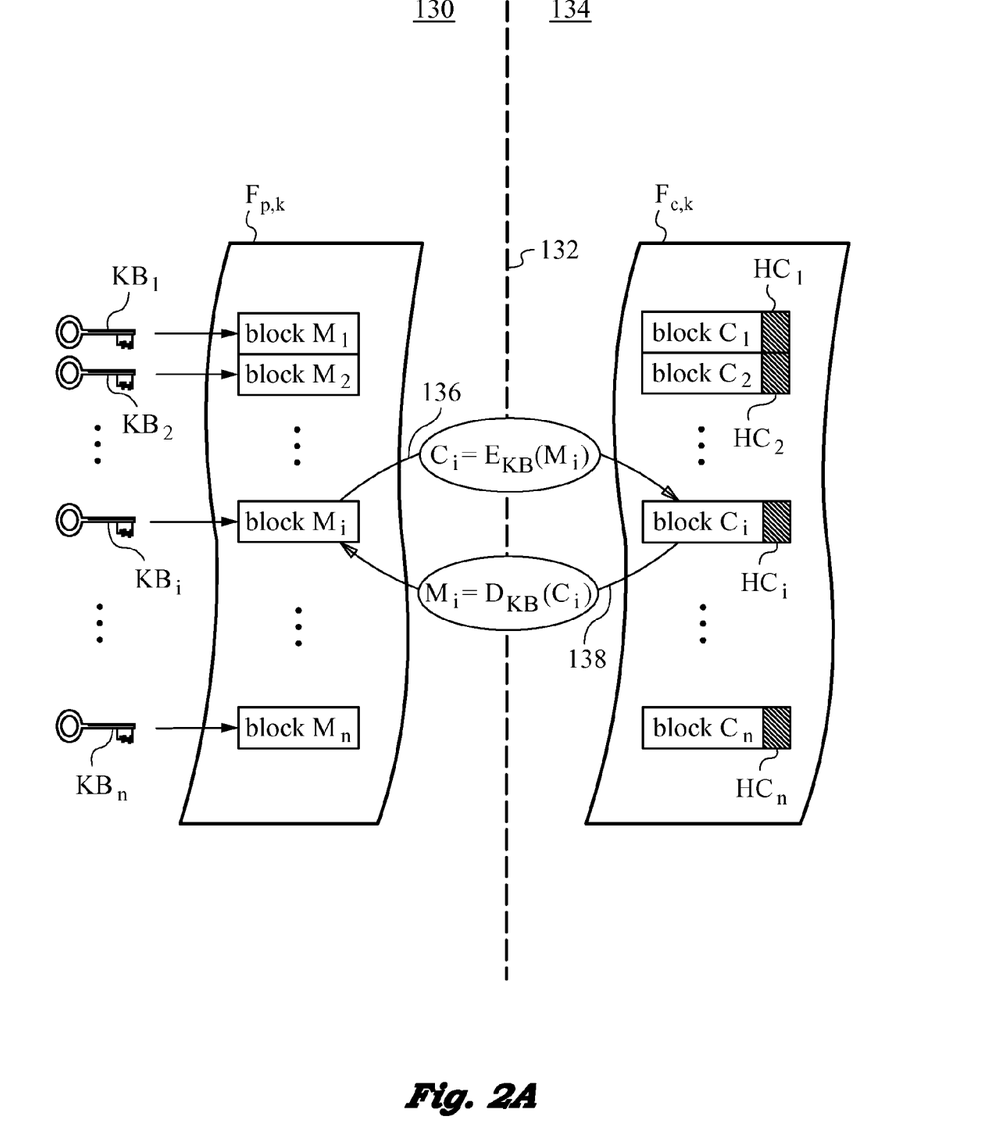
FIG. 2A-B are diagrams illustrating the basics of an encoding process according to the invention.
Figure 2B:
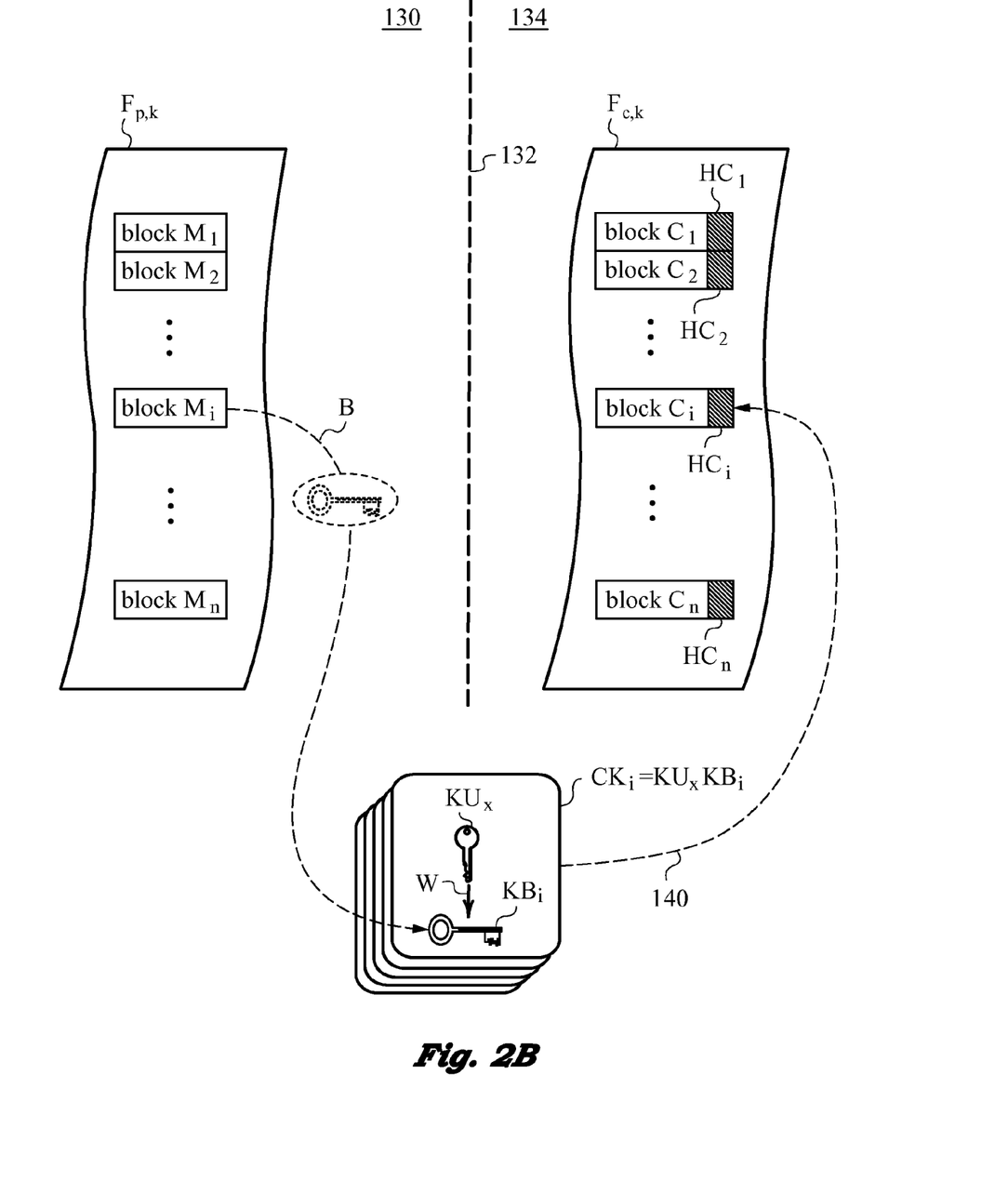

The operation of computer system 100 will now be described in reference to the high-level diagram of FIG. 1 and more detailed diagrams presented in FIGS. 2A-B showing the basics of the encoding process. Turning our attention first to key manager 118 in FIG. 1, we note that manager 118 deploys symmetric user keys KU. Symmetric encryption has the advantage that it is more efficient at processing large amounts of file encryptions and is computationally less intensive than encryption with asymmetric keys.

In the preferred embodiment of the invention, per-block keys KB as well as user keys KU are symmetric. The method of securing a plaintext file F in file system 114A will be best understood by initially referring to the handling of just one very specific plaintext file $F_{p,k}$. This handling is appropriate for unencrypted distributed file system.

As remarked above, file $F_{p,k}$ belongs to distributed file system 114A. Its encrypted form $F_{c,k}$ is distributed over blocks C within the designated area of the top hard disk belonging to hard disk array 112B. The first portion of the file subscript, "p" or "k", refers to whether the file is plaintext or ciphertext. The second portion of the file subscript, "k", refers to the actual file. In the present case "k" indicates the k-th file from among files F present in file system 114A.

Turning our attention to FIG. 2A, we see k-th plaintext file $F_{p,k}$ with explicit designation of blocks M of which it consists while being worked on in the memory of laptop computer 102. In particular, file $F_{p,k}$ is distributed in n blocks designated here as blocks $M_1, M_2, \ldots, M_n$. Notice that plaintext file $F_{p,k}$ as shown on the left in the drawing has not yet been secured. Possibly, file $F_{p,k}$ is a document in any typical format (e.g., Work, Excel, etc.) and it is being processed by user $U_x$ on laptop 102. Thus, plaintext file $F_{p,k}$ resides in an unencrypted space 130, sometimes also referred to by those skilled in the art as the plain text subspace.

For better visualization and for purposes of explanation, unencrypted space 130 that holds plaintext files is shown left of a dashed line 132. Meanwhile, an encrypted space 134 where encrypted files are found is located to the right of dashed line 132.

As shown in FIG. 2A, symmetric per-block keys KB are generated so as to provide one for each of the n blocks $M_1$, $M_2$, ..., $M_n$ of which plaintext file $F_{p,k}$ is comprised. In particular, per-block key $KB_1$ is generated for block $M_1$, per-block key $KB_2$ is generated for block $M_2$, and so on, with n-th per-block key $KB_n$ being generated for the last or n-th block $M_n$ of file $F_{p,k}$. Of course, remaining plaintext files $F_p$ in file system 114A are treated in a similar fashion. Thus symmetric per-block keys KB are generated for all plaintext files $F_{p,k}$ that are to be encrypted.

Each one of blocks $M_1$, $M_2$, ..., $M_n$ is encrypted using its per-block key $KB_1$, $KB_2$, ..., $KB_n$. In the case of first block $M_1$ its per-block key $KB_1$ is applied to the contents of block $M_1$ to perform the encryption. The same is done with the remaining blocks M using their respective per-block keys KB.

The encryption step is expressly visualized in FIG. 2A for the intermediate i-th block $M_i$. The application of encryption to block $M_i$ with the per-block key $KB_i$ is indicated by $E_{KB}$ (since this action applies to encryption in general, the subscript i has been left out). The action produces a resultant cipher block $C_i$. This operation can be conveniently summarized as:

$$C_i = E_{KB}(M_i), \quad (Eq. 1)$$

where the fact that $E_{KB}$ is operating on i-th block $M_i$ is indicated by the parentheses around block $M_i$. Decryption is indicated by $D_{KB}$. It is performed by just inverting the order of operation as follows:

$$M_i = D_{KB}(C_i), \quad (Eq. 2)$$

since per-block keys KB are symmetric. FIG. 2A also uses an arrow 136 to help visualize how the operation of Eq. 1 takes unencrypted block $M_i$ from plaintext space 130 to encrypted block $C_i$ in ciphertext space 134. Similarly, arrow 138 shows the action of Eq. 2, which returns unencrypted block $M_i$ from encrypted block $C_i$. In other words, Eq. 2 takes us from encrypted or ciphertext space 134 back to unencrypted or plaintext space 130.

The encryption $E_{KB}$ in accordance with Eq. 1 in applied to all blocks $M_1$, $M_2$, ..., $M_n$. This results in the encryption of entire k-th plaintext file $F_{p,k}$ to produce the corresponding k-th encrypted or ciphertext file $F_{c,k}$. Again, remaining plaintext files $F_p$ in file system 114A are treated in a similar fashion to obtain their correspondent ciphertext files $F_c$.

As a visualization aid, FIG. 1 indicates the physical location of ciphertext file $F_{c,k}$ once encrypted and stored in storage resources 112B of cluster 106. Specifically, ciphertext file $F_{c,k}$ is distributed over blocks $C_1$, $C_2$, ..., $C_n$ in the top hard disk of disk array 112B. In other words, the files in file system 114A are actually stored encrypted.

It should be noted that the encryption and decryption steps are precipitated by the actions of user $U_x$ and take place on client device 102 (see FIG. 1). They take place before the file is placed in file system 114A.

In accordance with the invention, securing of a plaintext file $F_p$, as demonstrated on the example of k-th plaintext file $F_{p,k}$ converted to k-th ciphertext file $F_{c,k}$, involves the additional step of encrypting each per-block key $KB_1$, $KB_2$, ..., $KB_n$. In other words, each one of per-block keys $KB_1$, $KB_2$, ..., $K_n$, which was used in the encryption of corresponding blocks $M_1$, $M_2$, ..., $M_n$ to thus obtain encrypted blocks $C_1$, $C_2$, ..., $C_n$ and convert plaintext file $F_{p,k}$ to ciphertext file $F_{c,k}$, is itself separately encrypted. The encryption of per-block keys KB that were used to generate encrypted blocks C is performed with the user key KU. In other words, the encryption of per-block keys KB provided for by the present invention is user-specific.

In general, there may be more than one user key KU for any given block M of any file F. Therefore, any block key KB may be encrypted with different user key KU. This will generate several wrapped block keys KB, each wrapped key encrypted with a different user key KU. This type of approach allows access to the same block M by different users U or groups of users that use different user keys.

FIG. 2B illustrates the important step of encrypting a block key KB in a typical case. In this example, we focus on the already encrypted i-th block $C_i$ obtained from unencrypted i-th block $M_i$ through encryption with i-th per-block key $KB_i$. Specific user $U_x$ of our example was assigned by key manager 118 user key $KU_x$ (see FIG. 1). User key $KU_x$ is now deployed to encrypt each per-block key KB. The encryption includes specifically i-th per-block key $KB_i$ generated for block $M_i$ as indicated by dashed arrow B.

In FIG. 2B the key encrypting operation of user key $KU_x$ acting on per-block key $KB_i$ is indicated by a short arrow W. The encrypting function denoted by arrow W will be referred to as wrapping. A person skilled in the art will recognize that encrypting a key with another key is commonly referred to as wrapping and is standard in the art of cryptography.

The application of the key-wrapping step yields one wrapped key $CK_i$ for each of the encrypted blocks $C_i$. Wrapped keys CK thus obtained, are placed in headers HC of corresponding encrypted blocks C. Therefore, wrapped key $CK_i$ is placed in header $HC_i$ of encrypted block $C_i$, as indicated by arrow 140. Advantageously, the introduction of wrapped keys CK introduces a new level of indirection to ciphertext file $F_{c,k}$ that is appropriate for the semi-trusted client threat model.

Computer system 100 implements the above-described method to secure all files $F_p$ in distributed file system 114A on storage resources 112A, 112B, 112Q and any other resources not shown in FIG. 1 that support file system 114A. An authenticable user U of file system 114A can now gain access to ciphertext files $F_c$ in file system 114A encrypted in accordance with the method of invention provided the per-block keys KB of ciphertext files $F_c$ are encrypted in his or her user key KU. Prior to obtaining his or her user key KU, however, user U has to be authenticated. In accordance with the present invention, user authentication is not dependent on the particular client device 102 that user U has chosen to connect to cluster 106 via network connection 104.

Figure 3:
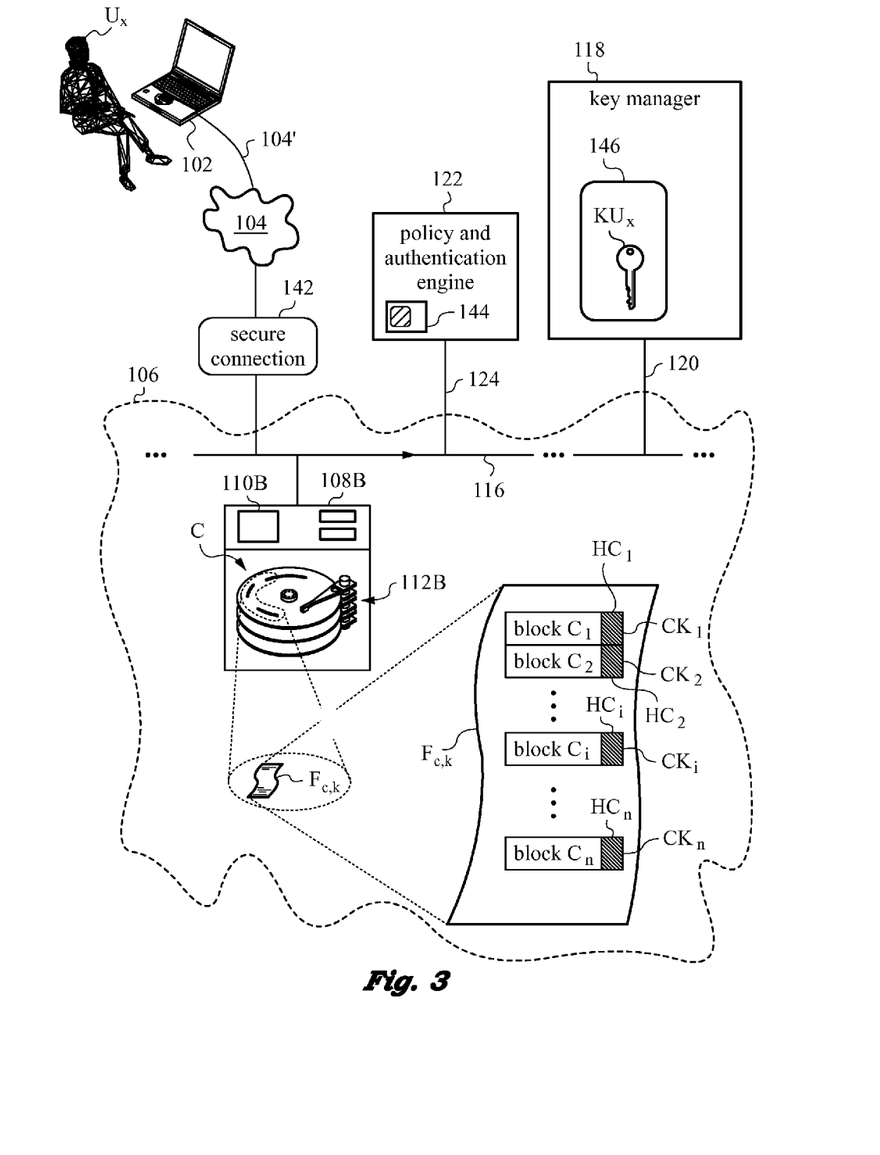
FIG. 3 is a diagram illustrating how a user accesses a file secured according to the invention.

FIG. 3 is a diagram that shows how specific user $U_x$ accesses a desired ciphertext file $F_c$ in file system 114A. For ease of explanation, we examine the case in which the requested ciphertext file $F_c$ is actually the k-th ciphertext file $F_{c,k}$ secured with the aid of wrapped keys CK placed in headers HC. Ciphertext file $F_{c,k}$ is stored in physical blocks here designated as blocks C to remind us that they hold encrypted data. As already indicated in FIG. 1, blocks C reside in the region of the top hard disk of hard disk array 112B designated by the dashed outline. Two levels of an exploded view show ciphertext file $F_{c,k}$ and then its structure. Ciphertext file $F_{c,k}$ is distributed over ciphertext blocks $C_1, C_2, \ldots, C_n$ with corresponding headers $CH_1, CH_2, \ldots, CH_n$. As already explained above, headers $CH_1, CH_2, \ldots, CH_n$ contain wrapped keys $CK_1, CK_2, \ldots, CK_n$ required to retrieve plaintext file $F_{p,k}$.

Before proceeding, it should be noted that in many practical situations actual ciphertext blocks $CK_1, CK_2, \ldots, CK_n$ will not be sequential or have any prescribed standoff. They may not even be located on the same storage resources. What is required is that ciphertext files $F_c$ and their ciphertext blocks C secured according to the method of the invention be indexed in file system 114A so as to be accessible upon request from users U.

We now return to our specific user $U_x$ operating with untrusted client device embodied by laptop computer 102. User $U_x$ makes a connection with cluster 106 in which a part of computer system 100 is implemented. The contact is made via network connection 104 over medium 104'. In a preferred embodiment, network connection 104 is not a simple connection. Instead, it is a secure and mutually authenticated connection 142. In other words, both laptop computer 102 and policy and authentication engine 122 establish mutually authenticated connection 142.

The mutually authenticated connection 142 is desirable for communications between client device 102 and key manager 118. Similarly, the security afforded by mutually authenticated connection 142 is desirable for communications between client device 118 and policy and authentication engine 122 itself. In fact, communication with any nodes of cluster 106 may also be within the context of mutually authenticated connection 142. Note, however, that the only secure connections needed are between user's device 102 and key manager 118, and between key manager 118 and policy and authentication engine 122. This is true even under circumstances where engine 122 and key manager 118 are integrated into a single module, although in this case connection 142 need in principle only extend to that single module.

The step of authenticating authenticable user $U_x$ is important. Doing so ensures, that despite the fact that client device 102 is untrusted, user $U_x$ is at least authenticated. Any suitable mutual authentication procedure known to those skilled in the art can be recruited for the purpose of establishing mutually authenticated connection 142. For example, connection 142 can be a secure connection such as a Transport Layer Security (TLS) connection with the client authenticated by password, certificate or Kerberos token. Irrespective of the actual processes and services invoked in establishing connection 142, however, it is important that it be protected from modification.

In the present embodiment, it is the policy and authentication engine 122 that actually records user's $U_x$ permissions within file system 114A. In other words, engine 122 keeps track of which plaintext files $F_p$ were secured according to the invention in authorized sessions of user $U_x$ and computer system 100. Therefore, engine 122 has a record of which encrypted files $F_c$ can be legitimately requested by user $U_x$.

In the present embodiment the connection between key manager 118 and engine 122 is also a secure connection. In other words, the path connecting them via connections 120, 124, and interconnections 116 (e.g., the LAN of cluster 106) is secure. When key manager 118 gets a request from user $U_x$ it queries engine 122 for authentication and access information. If engine 122 approves user $U_x$, then key manager 118 releases the corresponding user key $KU_x$.

Since key manger 118 that releases user key $KU_x$ to user $U_x$ is separate from engine 122 in the present embodiment a token-based approach is advantageous to ensure approved key release. Such approach is mostly easily implemented by introducing a token 144 that user $U_x$ can obtain from engine 122 upon authentication.

Key manager 118 can just send user key $KU_x$ directly to user $U_x$ if connection 142 is also encrypted. If connection 142 is not encrypted, then additional safety measures such as key wraps in key exchange keys should be deployed, as discussed in more detail below.

Upon verification of token 144, user key $KU_x$ is released to user $U_x$ from key manager 118. The step of releasing user key $KU_x$ is performed after receiving a request from user $U_x$ for ciphertext file $F_x$.

As mentioned above, if secure mutually authenticated connection 142 is not used, it is desirable that user key $KU_x$, when sent to user $U_x$ upon their specific request for ciphertext file $F_{c,k}$, be transmitted wrapped in a key exchange key 146. Key exchange key 146 can be any suitable exchange protocol. Such strategies are based on previously negotatiated parameters between device 102 and key manager 118. Suitable processes are well known to those skilled in the art.

Once in possession of their user key $KU_x$, user $U_x$ can decode the desired ciphertext file $F_{c,k}$ stored in file system 114A. Recall that upon encryption with per-block keys $KB_1, KB_2, \ldots, KB_n$ ciphertext file $F_{c,k}$ was further secured by encrypting per-block keys $KB_1, KB_2, \ldots, KB_n$ with user key $KU_x$. The resulting wrapped keys $CK_1, CK_2, \ldots, CK_n$ were then placed in headers $HC_1, HC_2, \ldots, HC_n$. Since user $U_x$ is now in possession of user key $KU_x$ that was used to generate wrapped keys $CK_1, CK_2, \ldots, CK_n$, he can decrypt per-block keys $KB_1, KB_2, \ldots, KB_n$ from wrapped keys $CK_1, CK_2, \ldots, CK_n$ with user key $KU_x$. With the decrypted per-block keys $KB_1, KB_2, \ldots, KB_n$, user $U_x$ can now verify the integrity of cipher blocks $C_1, C_2, \ldots, C_n$ and decrypt ciphertext file $F_{c,k}$ by applying the operation of Eq. 2 (also see arrow 138 in FIG. 2A). This last step recovers original plaintext file $F_{p,k}$ that user $U_x$ wanted to access.

There are thus four steps for accessing any ciphertext file $F_c$ in distributed file system 114A. During the first step, user $U_x$ retrieves blocks C that contain the file of interest from file system 114A onto user's device 102. Then user $U_x$ is authenticated and obtains their user key(s) KU. Upon receipt, user $U_x$ deploys their user key(s) KU to decrypt wrapped key(s) CK, thus obtaining per-block key(s) KB. Finally, user $U_x$ decrypts blocks C of ciphertext file $F_c$ by deploying per-block keys KB to obtain decrypted, plaintext file $F_p$.

Computer system 100 and the method of the invention offer an efficient way to secure distributed file system 114A of cluster 106. In fact, system 100 and the method are compatible with cluster 106 whether the latter is embodied by a regular cluster or a high performance and high availability cluster. In other words, the system and method are compatible with high-performance implementations where file system 112A is available for processing on multiple nodes 108 within cluster 106 (cluster computing) and simultaneously available to many users U accessing cluster 106 via many untrusted client devices 102.

The two main reasons for this compatibility are the use of symmetric keys and the encoding of per-block keys KB with user keys KU. Since all keys are symmetric, they are inherently fast and efficient in securing files. Additionally, since per-block keys KB can be encoded with user keys KU of different users independently, the user load does not tend to affect the present system and method. Differently put, using the additional level of indirection in accordance with the invention, means that expanding the key pool with additional user keys KU only requires that per-block keys be encrypted in the added user keys rather than forcing encryption of an entire block in the added user key KU. As a result, the present system and method can be used to encrypt data files in a way that cryptographically enforces data access permissions yet does not greatly impact performance or usability. These characteristics allow for fast data analysis on nodes 108 of cluster 106.

Although the invention can be practiced in many contexts, it is preferably implemented in a file system that is a distributed file system (DFS) with distributed storage resources. The embodiment described in reference to FIGS. 1-3 was deployed in such distributed file system 114A. More specifically, file system 114A can be the Hadoop Distributed File System (HDSF), Mogile File System (Mogile FS), or another suitable distributed file system.

Some encrypted and distributed file systems cannot be easily deployed, as they do not meet certain requirements and are not designed for handling "big data" cluster computing. Even in the case of suitable systems, such as HDFS some modifications are necessary. For example, in the case of HDFS the requirement of confidentiality is not met and hence encryption has to be employed, as already mentioned above. With sufficient modifications however, as will be appreciated by those skilled in the art, almost any distributed file system and even non-distributed file systems can deploy the system and method of the invention. Many additional advantages of the system and method of the invention will now be elucidated in conjunction with the next embodiment.

Figure 4:
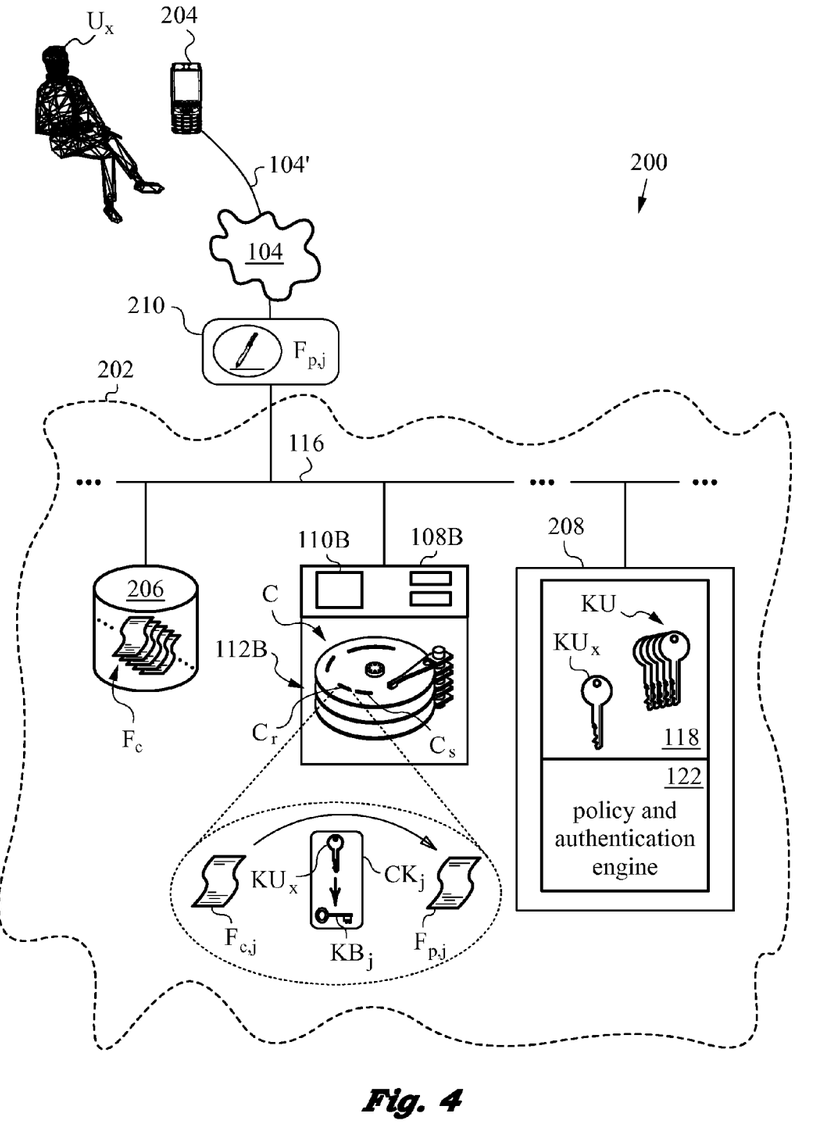
FIG. 4 is a diagram illustrating another embodiment of a computer system and the method while executing a write request.

FIG. 4 illustrates an embodiment of a computer system 200 that is more completely integrated with a high availability and high performance cluster 202. The same or analogous parts are labeled with the same reference numerals as in the previous drawings for more clarity.

As in the prior embodiment, specific user $U_x$ connects to cluster 202 via network 104. This time, however, untrusted client device 204 is embodied by a mobile phone. Phone 204 uses wireless medium 104' to make network connection 104 and gain access to a distributed file system 206 on cluster 202. Distributed file system 206 contains many ciphertext files $F_c$. File system 206 is using the file securing methods of the invention already described above in encrypting ciphertext $F_c$ files from plaintext files $F_p$.

For reasons of clarity, only node 108B with its storage resources 112B is shown explicitly in FIG. 4. The blocks of storage resources 112B are formatted into blocks C that contain data in ciphertext form. In fact, blocks C contain ciphertext files $F_c$ of distributed file system 206. The j-th ciphertext file $F_{c,j}$ belonging to file system 206 and stored in a single block $C_r$ of storage resources 112B of node 108B is shown explicitly in an exploded view portion.

Computer system 200 has a module 208 that integrates key manager 118 with policy and authentication engine 122. In some embodiments, module 208 can be embodied by corresponding hardware and software resources of a slave or a master node of computer cluster 202.

Upon establishment of secure and mutually authenticated connection between user $U_x$ and computer system 200 in cluster 202, user $U_x$ requests access to ciphertext file $F_{c,j}$. This is performed in accordance with the description provided above, namely by deploying user key $KU_x$ to decode per-block key $BK_j$ from wrapped key $CK_j$. Then, decrypted per-block key $BK_j$ is employed to decode ciphertext block $C_r$ containing ciphertext file $F_{c,j}$. Upon completion of the decryption process user $U_x$ is in possession of decrypted plaintext file $F_{p,j}$.

At this point, user $U_x$ desires to write a new block by adding data to plaintext file $F_{p,j}$. To write this new block, user $U_x$ sends a write request 210. Write request 210 identifies the location of the intended block to be written to policy and authentication engine 122 in module 208. Engine 122 looks up user $U_x$, the block location and the file/block permissions in its policy database to determine the permissions associated with user key $KU_x$.

If cleared, the code on user's device 204 generates a block key $KB_s$ for encrypting the added data in new block $C_s$ in accordance with the above-described procedures. Note that in this example data is being appended in new block $C_s$ rather than being overwritten in already existing block $C_r$.

Figure 5:
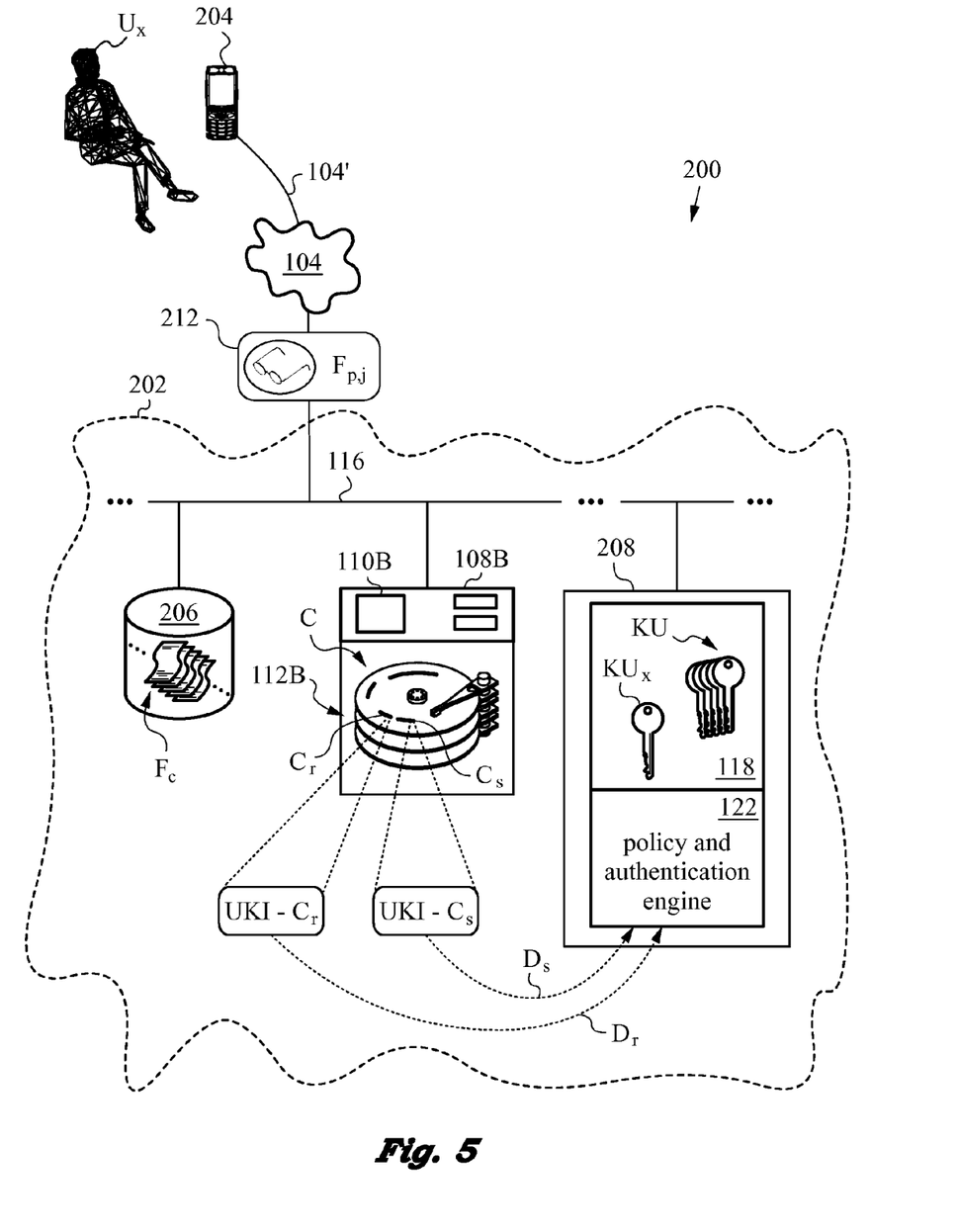
FIG. 5 is a diagram of the computer system and method of FIG. 4 while executing a read request.

FIG. 5 illustrates the same embodiment of computer system 200, in which, at some later time, user $U_x$ issues a read request 212. Read request 212 is directed to ciphertext file $F_{c,j}$ that had been previously modified by user $U_x$ by appending to it some additional data. Based on the previous user actions, updated ciphertext file $F_{c,j}$ of distributed file system 206 occupies physical blocks $C_r$ and $C_s$ in storage resources 112B.

In accordance with an additional security aspect implemented in the present embodiment of the invention, user key IDs are deployed to identify which user key has been used to wrap the block key. This allows for multiple user keys per user and/or for user keys that are shared between users. To this end, each block containing a ciphertext file $F_c$ belonging to distributed file system 206 carries, preferably in its header, user key IDs (UKIs) for users that are allowed access. The UKIs are used by policy and authentication engine 122 in granting users access to keys in key manager 118.

Returning to our example, user $U_x$ has just submitted read request 212 for ciphertext file $F_{c,j}$ in blocks $C_r$ and $C_s$. Hence, user key IDs (UKIs) for these two blocks, namely UKI-$C_r$ and UKI-$C_s$ need to be collected. In particular, user key IDs UKI-$C_r$, UKI-$C_s$ are collected and submitted to policy and authentication engine 122 in module 208 as shown by dashed arrows $D_r$, $D_s$. Of course, in this collection process user key IDs UKI-$C_r$, UKI-$C_s$ are actually remitted to engine 122 via interconnections 116 of cluster 202.

Engine 122 decides, based on identity and authentication of user $U_x$, if client device 204 that user $U_x$ is employing is allowed access to any user keys KU, as identified by user key IDs UKI-C. If it is, then engine 122 can allow user $U_x$ access to user keys KU.

In the present case, user $U_x$ has not been suspended, disqualified or even removed since writing file in blocks $C_r$ and $C_s$. Therefore, engine 122 identifies the user keys from key IDs UKI-$C_r$, UKI-$C_s$ and then determines if user $U_x$ has retained their authorization to use the identified user keys $KU_x$. If so, then engine 122 sends the corresponding release to key manager 118 for user keys $KU_x$. User keys $KU_x$ are then returned to user $U_x$, who can now use them to read and perform any other authorized actions to file $F_{c,j}$.

A person skilled in the art will recognize at this point that the central aspects of the invention can be implemented in many ways. First and foremost, it is clear that there can be more than one user key KU per user U. Furthermore, user keys KU can be shared between groups of users U. Using the level of indirection provided in the present invention also means that adding additional user keys KU only requires that the block key KB be encrypted in the added user key KU rather than encrypting the entire block in the added user key, as would have been typical in prior art systems.

In practical implementations almost any particular user U will be a member of a group of authenticable users working on untrusted client devices. In those situations the user key KU can be shared among the group. In administering such situations, it is advantageous to introduce one or more permission zones that are defined by a mapping between the users and a set of permissions. The user key KU can then be shared with the zone or zones based on the established mapping. Establishment of such mappings is well within the capabilities of skilled artisans.

In the event of a compromised user key KU, the affected key is revoked from user U (or users). This means that key KU can no longer be used by that user (or users). This process does not force any re-encryption of the files in the distributed file system or any other file system in which the invention is practiced. Of course, this is due to the fact that the files are encoded in the per-block keys BK, which are not compromised together with the user key(s). Indeed, deployment of the methods of invention in a stackable or layered file system where there is isolation of the encryption functionality from the details of the physical file system is thus very advantageous. In this way, the encryption layer can be reused for many physical file systems.

The present "layered approach" to security under the semi-trusted client model is particularly well-adapted to modern mobile environments. In fact, the computers system of the invention supports applications where users access the file system from many mobile and stationary devices at different times and from different locations. Thus, the untrusted client device can be any mobile user device that may not be the user's permanent or even preferred device. In general, the untrusted client device can be a mobile phone, a mobile computer, a tablet computer and any one of a large and growing number of thin client devices that include sensor-based computing units on the Internet of things.

It is also noted that breaking up the storage units into segments other than blocks may be practicable in some systems.

For example, depending on file sizes and types, a per-file approach can be implemented.

In view of the above teaching, a person skilled in the art will recognize that the invention can be embodied in many different ways in addition to those described without departing from the spirit of the invention. Therefore, the scope of the invention should be judged in view of the appended claims and their legal equivalents.

I claim:

1. A computer-implemented method for securing a plaintext file $F_p$ in a file system comprising the steps of:
   (a) providing storage resources in said file system;
   (b) providing said storage resources to be accessible to an authenticable user U with an untrusted client device;
   (c) distributing said plaintext file $F_p$ to at least one block $M_i$ belonging to said storage resources;
   (d) assigning to each of said at least one block $M_i$ a corresponding symmetric per-block key $KB_i$;
   (e) encrypting said at least one block $M_i$ of said plaintext file $F_p$ with said corresponding symmetric per-block key $KB_i$ to obtain corresponding at least one encrypted block $C_i$ of a ciphertext file $F_p$ corresponding to said plaintext file $F_p$;
   (f) assigning to said authenticable user U a user key KU;
   (g) encrypting each said corresponding per-block key $KB_i$ with said user key KU to generate a wrapped key to said at least one encrypted block $C_i$; and
   (h) placing said wrapped key in a header of said at least one encrypted block $C_i$;
whereby said plaintext file $F_p$ is secured as said ciphertext file $F_p$ accessible to said authenticable user U.

2. The method of claim 1, further comprising the steps of:
   (i) transmitting said corresponding symmetric per-block key $KB_i$ to a key manager;
   (j) performing said encrypting step in said key manager; and
   (k) returning said wrapped key to said authenticable user U from said key manager.

3. The method of claim 1, further comprising the steps of:
   (i) storing said user key KU in a key manager;
   (j) authenticating said authenticable user U; and
   (k) releasing said user key KU to said authenticable user U upon authentication.

4. The method of claim 3, wherein said step of releasing said user key KU is performed after receiving from said authenticable user U a request for said ciphertext file $F_c$.

5. The method of claim 3, wherein said authentication step is performed by a policy and authentication engine.

6. The method of claim 5, wherein upon receiving from said authenticable user U a request for said ciphertext file $F_c$, the method further comprises the steps of:
   (l) collecting a user key ID from at least one encrypted block $C_i$ containing said ciphertext file $F_c$;
   (m) submitting said user key ID to said policy and authentication engine; and
   (n) using said user key ID to identify said user key KU.

7. The method of claim 6, wherein said wrapped key is transmitted to said key manager and when said authenticable user U is authenticated by said policy and authentication engine, said wrapped key is decrypted by said user key KU and said block key $KB_i$ is returned to said authenticable user U.

8. The method of claim 6, wherein said step of using of said user key ID to identify said user key KU is performed by said key manager.

9. The method of claim 5, wherein said key manager and said policy and authentication engine are merged into a single module.

10. The method of claim 5, further comprising the step of establishing a secure mutually authenticated connection between said untrusted client device, said key manager and said policy and authentication engine.

11. The method of claim 10, further comprising sending said user key KU wrapped in a key exchange key to said authenticable user U.

12. The method of claim 1, wherein said file system is a distributed file system and said storage resources are distributed storage resources.

13. The method of claim 12, wherein said distributed file system and said distributed storage resources are deployed on a computer cluster.

14. The method of claim 1, wherein said authenticable user U belongs to a group of authenticable users and said user key KU is shared among said group of authenticable users.

15. The method of claim 14, wherein said user key KU is shared within at least one permission zone defined by a mapping between said authenticable users and a set of permissions.

16. The method of claim 1, further comprising the step of revoking said user key KU of said authenticable user U.

17. A computer system operating under a semi-trusted user threat model that supports an authenticable user U with an untrusted client device, said computer system comprising:
   (a) storage resources partitioned into blocks $M_i$ with a plaintext file $F_p$ distributed over at least one of said blocks $M_i$, each of said blocks $M_i$ being assigned a corresponding symmetric per-block key $KB_i$;
   (b) a file system that encrypts said at least one of said blocks $M_i$ of said plaintext file $F_p$ with said corresponding symmetric per-block key $KB_i$ to obtain corresponding at least one encrypted block $C_i$ of a ciphertext file $F_c$ corresponding to said plaintext file $F_p$;

(c) a key manager for assigning said authenticable user U a user key KU, such that said file system encrypts each said corresponding per-block key $KB_i$ with said user key KU to generate a wrapped key to said at least one encrypted block $C_i$ and places said wrapped key in a header of said at least one encrypted block $C_i$;

(d) a policies and authentication engine for authenticating said authenticable user U accessing said file system with said untrusted client device; and (e) said plaintext file $F_p$ secured as said ciphertext file $F_c$ accessible to said authenticable user U.

18. The computer system of claim 17, wherein said file system is a distributed file system, said storage resources are distributed storage resources and said computer system comprises at least one computer cluster.

19. The computer system of claim 18, wherein said distributed file system is selected from the group consisting of Mogile FS and Hadoop Distributed File System.

20. The computer system of claim 18, wherein said at least one computer cluster comprises a high availability computer cluster.

21. The computer system of claim 17, wherein said untrusted client device is selected from the group of mobile user devices consisting of mobile phones, mobile computers, tablet computers and thin client devices.

22. The computer system of claim 17, wherein said key manager and said policy and authentication engine are merged into a single module.

\* \* \* \* \*